(12) United States Patent
Kawahara et al.

(10) Patent No.: US 12,442,860 B2
(45) Date of Patent: Oct. 14, 2025

(54) BATTERY CHARACTERISTIC ESTIMATION DEVICE, BATTERY CHARACTERISTIC ESTIMATION METHOD, AND STORAGE MEDIUM

(71) Applicant: HONDA MOTOR CO., LTD., Tokyo (JP)

(72) Inventors: Takuma Kawahara, Wako (JP); Tatsuki Yamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 388 days.

(21) Appl. No.: 17/948,259

(22) Filed: Sep. 20, 2022

(65) Prior Publication Data

US 2023/0094275 A1 Mar. 30, 2023

(30) Foreign Application Priority Data

Sep. 28, 2021 (JP) .................................. 2021-157925

(51) Int. Cl.
*G01R 31/36* (2020.01)
*G01R 31/367* (2019.01)
(Continued)

(52) U.S. Cl.
CPC ....... *G01R 31/3648* (2013.01); *G01R 31/367* (2019.01); *G01R 31/385* (2019.01); (Continued)

(58) Field of Classification Search
CPC .............. G01R 31/3648; G01R 31/367; G01R 31/385; H01M 10/484; H01M 4/587; H01M 10/0525; H01M 10/48; Y02E 60/10
See application file for complete search history.

(56) References Cited

U.S. PATENT DOCUMENTS

| 10,416,236 B2 * | 9/2019 | Uchino ................ G01R 31/392 |
| 2017/0030974 A1 | 2/2017 | Becker et al. |

(Continued)

FOREIGN PATENT DOCUMENTS

| CN | 112526350 | | 3/2021 |
| CN | 112733427 A | * | 4/2021 |

(Continued)

OTHER PUBLICATIONS

Lee et al. ("Estimation Error Bound of Battery Electrode Parameters With Limited Data Window," in IEEE Transactions on Industrial Informatics, vol. 16, No. 5, pp. 3376-3386, May 2020, doi: 10.1109/TII.2019.2952066.) (Year: 2020).*

(Continued)

*Primary Examiner* — Lisa M Caputo
*Assistant Examiner* — Christian T Bryant
(74) *Attorney, Agent, or Firm* — Amin, Turocy & Watson, LLP (57) ABSTRACT

A battery characteristic estimation device including a storage medium that stores computer-readable instructions, and a processor coupled to the storage medium, the processor executing the computer-readable instructions to: acquire time-series data of at least a voltage and current of a secondary battery having a positive electrode containing a positive electrode active material and a negative electrode containing a negative electrode active material; store a reference positive electrode OCP curve, and a reference negative electrode OCP curve; convert the reference positive electrode OCP curve into a positive electrode OCP curve in accordance with a first parameter group, convert the reference negative electrode OCP curve into a negative electrode OCP curve in accordance with a second parameter group, and estimate an OCV curve on the basis of a difference between the positive electrode OCP curve and the negative (Continued)

electrode OCP curve; and optimize the first parameter group and the second parameter group.

7 Claims, 8 Drawing Sheets

(51) Int. Cl.
    *G01R 31/385*      (2019.01)
    *H01M 4/587*      (2010.01)
    *H01M 10/0525*      (2010.01)
    *H01M 10/48*      (2006.01)

(52) U.S. Cl.
    CPC .......... *H01M 10/484* (2013.01); *H01M 4/587* (2013.01); *H01M 10/0525* (2013.01); *H01M 10/48* (2013.01); *Y02E 60/10* (2013.01)

(56) References Cited

U.S. PATENT DOCUMENTS

2018/0284195 A1    10/2018    K et al.
2020/0088797 A1*    3/2020    Takahashi ............ G01R 31/385
2021/0088596 A1*    3/2021    Endo .................... G01R 31/367
2022/0390524 A1    12/2022    Takegami
2023/0014689 A1    1/2023    Ogasawara et al.

FOREIGN PATENT DOCUMENTS

| JP | 2016207287 A * | 12/2016 |
| JP | 2018-524602 | 8/2018 |
| JP | 2019-176637 | 10/2019 |
| JP | 2020-046420 | 3/2020 |
| WO | 2021/171333 | 9/2021 |
| WO | 2021/181536 | 9/2021 |

OTHER PUBLICATIONS

Japanese Office Action for Japanese Patent Application No. 2021-157925 mailed May 30, 2023.

* cited by examiner

BATTERY CHARACTERISTIC ESTIMATION DEVICE, BATTERY CHARACTERISTIC ESTIMATION METHOD, AND STORAGE MEDIUM

CROSS-REFERENCE TO RELATED APPLICATION

The application is based on Japanese Patent Application No. 2021-157925 filed on Sep. 28, 2021, the content of which incorporated herein by reference.

BACKGROUND

Field of the Invention

The present invention relates to a battery characteristic estimation device, a battery characteristic estimation method, and a storage medium.

Description of Related Art

Hitherto, the technology of estimating the degradation state of a lithium ion battery has been known. For example, Japanese Patent Application Laid-open No. 2020-046420 discloses the technology of calculating the surface stress of a negative electrode active material on the basis of a prescribed active material model, calculating the amount of change in the open potential of the negative electrode active material on the basis of the calculated surface stress, correcting the open potential of the negative electrode on the basis of the calculated amount of change in the open potential, and estimating an OCV (open circuit voltage) curve on the basis of the corrected open potential of the negative electrode.

The technology disclosed in Japanese Patent Application Laid-open No. 2020-046420 estimates the OCV curve by optimizing three parameters such that the measured OCV curve substantially matches the estimated OCV curve, which is estimated on the basis of the corrected open potential of the negative electrode. However, the related art sometimes requires execution of differentiation processing or the like for the measured OCV data to optimize the parameters, which results in an excessive calculation load required for optimization processing.

SUMMARY

The present invention has been made in view of the above-mentioned circumstances, and has an object to provide a battery characteristic estimation device, a battery characteristic estimation method, and a storage medium, which are capable of reducing the calculation load required for optimization processing of parameters.

A battery characteristic estimation device, a battery characteristic estimation method, and a storage medium according to one embodiment of the present invention adopt the following configurations.

(1): According to an aspect of the present invention, there is provided a battery characteristic estimation device including a storage medium that stores computer-readable instructions, and a processor coupled to the storage medium, the processor executing the computer-readable instructions to: acquire time-series data of at least a voltage and current of a secondary battery having a positive electrode containing a positive electrode active material and a negative electrode containing a negative electrode active material; store a reference positive electrode OCP curve, which indicates an open circuit voltage change with respect to a discharge capacity of the positive electrode, and a reference negative electrode OCP curve, which indicates an open circuit voltage change with respect to a discharge capacity of the negative electrode; convert the reference positive electrode OCP curve into a positive electrode OCP curve in accordance with a first parameter group, convert the reference negative electrode OCP curve into a negative electrode OCP curve in accordance with a second parameter group, and estimate an OCV curve, which indicates an open circuit voltage change with respect to a capacity change of the secondary battery, on the basis of a difference between the positive electrode OCP curve and the negative electrode OCP curve; and optimize the first parameter group and the second parameter group such that a value of an error function representing an error between the estimated OCV curve and the time-series data is equal to or smaller than a predetermined value.

(2): In the aspect (1), the first parameter group includes a positive electrode scaling factor for converting a width of a reference discharge capacity of a positive electrode into a width of an actual discharge capacity and a positive electrode shift amount, which is a shift amount in a discharge capacity direction from the reference positive electrode OCP curve to the positive electrode OCP curve, and the second parameter group includes a negative electrode scaling factor for converting a width of a reference discharge capacity of a negative electrode into a width of an actual discharge capacity and a negative electrode shift amount, which is a shift amount in a discharge capacity direction from the reference negative electrode OCP curve to the negative electrode OCP curve.

(3): In the aspect (1), the first parameter group includes a positive electrode scaling factor for converting a width of a reference discharge capacity of a positive electrode into a width of an actual discharge capacity and a positive electrode shift amount, which is a shift amount in a discharge capacity direction from the reference positive electrode OCP curve to the positive electrode OCP curve, and the second parameter group includes a negative electrode scaling factor for converting a width of a reference discharge capacity of a negative electrode into a width of an actual discharge capacity and a relative shift amount of the negative electrode OCP curve with respect to the positive electrode OCP curve in a discharge capacity direction, or the first parameter group includes a positive electrode scaling factor for converting a width of a reference discharge capacity of a positive electrode into a width of an actual discharge capacity and a relative shift amount of the positive electrode OCP curve with respect to the negative electrode OCP curve in a discharge capacity direction, and the second parameter group includes a negative electrode scaling factor for converting a width of a reference discharge capacity of a negative electrode into a width of an actual discharge capacity and a negative electrode shift amount, which is a shift amount in a discharge capacity direction from the reference negative electrode OCP curve to the negative electrode OCP curve.

(4): In the aspect (1), the positive electrode active material is a material containing at least one material among nickel cobalt manganese (NCM), nickel cobalt aluminum (NCA), lithium ferrophosphate (LFP), and lithium manganese oxide (LMO), the negative electrode active material is a material containing at least one material among hard carbon and graphite, the processor sets the negative electrode scaling factor on the basis of a map indicating a change in the negative electrode scaling factor with respect to a usage period of the battery or charge/discharge amount integrated value, and the processor optimizes first parameter group and the second parameter group excluding the negative electrode scaling factor such that a value of an error function representing an error with respect to the time-series data is equal to or smaller than a predetermined value.

(4): In the aspect (1), the positive electrode active material is a material containing at least one material among nickel cobalt manganese (NCM), nickel cobalt aluminum (NCA), lithium ferrophosphate (LFP), and lithium manganese oxide (LMO), the negative electrode active material is a material containing at least one material among hard carbon and graphite, the processor sets the negative electrode scaling factor on the basis of a map indicating a change in the negative electrode scaling factor with respect to a usage period of the battery or charge/discharge amount integrated value, and the processor optimizes first parameter group and the second parameter group excluding the negative electrode scaling factor such that a value of an error function representing an error with respect to the time-series data is equal to or smaller than a predetermined value.

(5): In the aspect (1), the processor extracts data, for which a voltage change due to charge/discharge is small, from the time-series data, and the processor performs optimization such that an error between the OCV curve and the extracted data is equal to or smaller than the predetermined value.

(6): In the aspect (5), the error function is a function that increases depending on a sum of the OCV curve and a value obtained by giving a weight an error of each extracted data, and the weight is set by counting the number of pieces of data of the extracted data for a plurality of sections of the discharge capacity or voltage value and decreasing a value of a weight corresponding to one of the plurality of sections as the counted number of pieces of data becomes larger.

(7): According to another aspect of the present invention, there is provided a battery characteristic estimation method to be executed by a computer, the battery characteristic estimation method including: acquiring time-series data of at least a voltage and current of a secondary battery having a positive electrode containing a positive electrode active material and a negative electrode containing a negative electrode active material; storing a reference positive electrode OCP curve, which indicates an open circuit voltage change with respect to a discharge capacity of the positive electrode, and a reference negative electrode OCP curve, which indicates an open circuit voltage change with respect to a discharge capacity of the negative electrode; converting the reference positive electrode OCP curve into a positive electrode OCP curve in accordance with a first parameter group, convert the reference negative electrode OCP curve into a negative electrode OCP curve in accordance with a second parameter group, and estimate an OCV curve, which indicates an open circuit voltage change with respect to a capacity change of the secondary battery, on the basis of a difference between the positive electrode OCP curve and the negative electrode OCP curve; and optimizing the first parameter group and the second parameter group such that a value of an error function representing an error between the estimated OCV curve and the time-series data is equal to or smaller than a predetermined value.

(8): According to another aspect of the present invention, there is provided a non-transitory computer-readable storage medium storing a program, the program causing to a computer to execute: acquiring time-series data of at least a voltage and current of a secondary battery having a positive electrode containing a positive electrode active material and a negative electrode containing a negative electrode active material; storing a reference positive electrode OCP curve, which indicates an open circuit voltage change with respect to a discharge capacity of the positive electrode, and a reference negative electrode OCP curve, which indicates an open circuit voltage change with respect to a discharge capacity of the negative electrode; converting the reference positive electrode OCP curve into a positive electrode OCP curve in accordance with a first parameter group, convert the reference negative electrode OCP curve into a negative electrode OCP curve in accordance with a second parameter group, and estimate an OCV curve, which indicates an open circuit voltage change with respect to a capacity change of the secondary battery, on the basis of a difference between the positive electrode OCP curve and the negative electrode OCP curve; and optimizing the first parameter group and the second parameter group such that a value of an error function representing an error between the estimated OCV curve and the time-series data is equal to or smaller than a predetermined value.

According to the aspects (1) to (8), it is possible to reduce the calculation load required for optimization processing of parameters.

According to the aspect (4), it is possible to execute optimization processing of parameters even when low SOC area data cannot be obtained.

According to the aspect (5), it is possible to estimate the OCV curve more accurately by executing optimization processing only for data that can be regarded as an OCV.

According to the aspect (6), it is possible to suppress deviation in fitting due to variation in data amount.

DESCRIPTION OF EMBODIMENTS

Now, a battery characteristic estimation device, a battery characteristic estimation method, and a storage medium according to an embodiment of the present invention are described with reference to the drawings.

[Vehicle Configuration]

Figure 1:
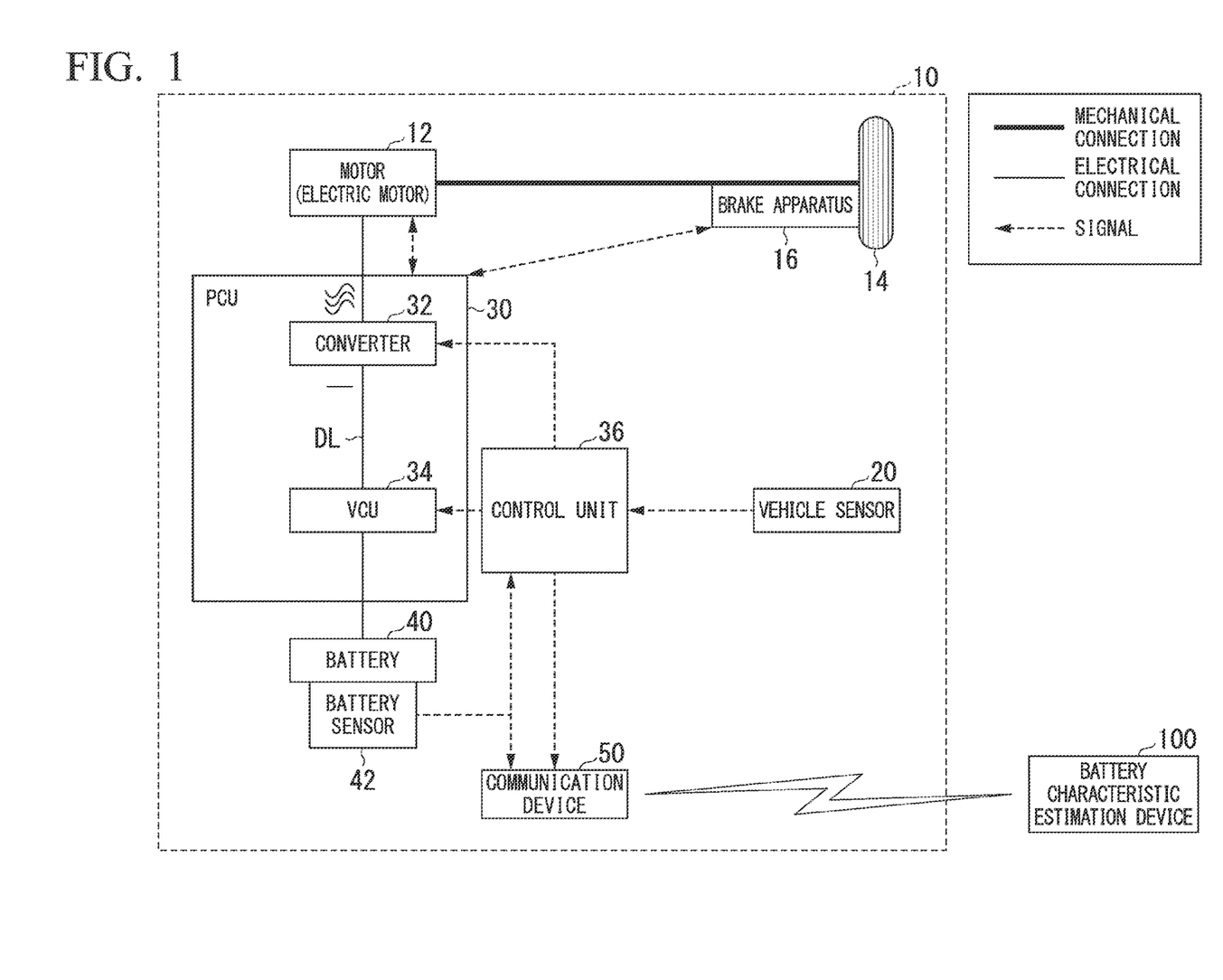
FIG. 1 is a diagram illustrating an exemplary configuration of a vehicle to which a battery characteristic estimation device according to an embodiment is applied.

FIG. 1 is a diagram illustrating an exemplary configuration of a vehicle 10 to which a battery characteristic estimation device 100 according to an embodiment is applied. The vehicle 10 illustrated in FIG. 1 is a battery electric vehicle (BEV) traveling using a motor (electric motor) driven by power supplied from a battery (secondary battery) for traveling. Alternatively, the vehicle 10 may be a plug-in hybrid vehicle (PHV) or a plug-in hybrid electric vehicle (PHEV), which is a hybrid vehicle having an external charging function. The vehicle 10 includes, for example, not only a four-wheeled vehicle, but also a saddle-riding two-wheeled vehicle, a three-wheeled vehicle (including a vehicle with two front wheels and one rear wheel in addition to one front wheel and two rear wheels), an assisted bicycle, and even an electric boat. The vehicle 10 includes any other mobile object that travels using an electric motor driven by power supplied from a battery.

A motor 12 is, for example, a three-phase AC motor. The rotor of the motor 12 is connected to a driven wheel 14. The motor 12 is driven by power supplied from an accumulation unit (not shown) included in a battery 40, and transmits the rotational force to the driven wheel 14. Further, the motor 12 generates power using kinetic energy of the vehicle 10 at the time of deceleration of the vehicle 10.

A brake apparatus 16 includes, for example, a brake caliper, a cylinder that transmits hydraulic pressure to the brake caliper, and an electric motor that generates hydraulic pressure in the cylinder. The brake apparatus 16 may be equipped with a mechanism as a backup, which transmits the hydraulic pressure generated by the operation by the user (driver) of the vehicle 10 against a brake pedal (not shown) to the cylinder via the master cylinder. The brake apparatus 16 is not limited to the configuration described above, but may be an electronically controlled hydraulic brake apparatus that transmits the hydraulic pressure from the master cylinder to the cylinder.

A vehicle sensor 20 includes, for example, an accelerator position sensor, a vehicle speed sensor, and a brake depression amount sensor. The accelerator position sensor is attached to the accelerator pedal, detects the amount of operation of the accelerator pedal by the driver, and outputs the detected amount of operation as the accelerator position to a control unit 36 described later. The vehicle speed sensor includes, for example, a wheel speed sensor attached to each wheel of the vehicle 10 and a speed calculator, which integrates the wheel speeds detected by the wheel speed sensors to derive the speed (vehicle speed) of the vehicle 10 for output to the control unit 36. A brake depression amount sensor is attached to the brake pedal, and detects the amount of operation of the brake pedal by the driver, and outputs the detected amount of operation to the control unit 36 as a brake depression amount.

A PCU 30 includes, for example, a converter 32 and a voltage control unit (VCU) 34. In FIG. 1, these components in the vehicle 10 are shown in a single component as the PCU 30 as an example, and may be arranged in a distributed manner.

The converter 32 is, for example, an AC-DC converter. The terminal of the converter 32 on the direct current side is connected to a direct current link DL. The direct current link DL is connected to the battery 40 via the VCU 34. The converter 32 converts alternating current generated by the motor 12 to direct current, and outputs the direct current to the direct current link DL.

The VCU 34 is, for example, a DC-DC converter. The VCU 34 increases the voltage of power supplied from the battery 40, and outputs the power to the direct current link DL.

The control unit 36 controls drive of the motor 12 on the basis of output from the accelerator position sensor included in the vehicle sensor 20. The control unit 36 controls the brake apparatus 16 on the basis of output from the brake depression amount sensor included in the vehicle sensor 20. The control unit 36 calculates, for example, an SOC (State Of Charge) of the battery 40 on the basis of output from a battery sensor 42 described later, which is connected to the battery 40, and outputs the SOC to the VCU 34. The VCU 34 increases the voltage of the direct current link DL in response to an instruction from the control unit 36.

The battery 40 is a secondary battery capable of repeatedly charging and discharging, such as a lithium ion battery. The positive electrode active material forming the positive electrode of the battery 40 is, for example, a material containing at least one material among nickel cobalt manganese (NCM), nickel cobalt aluminum (NCA), lithium ferrophosphate (LFP), and lithium manganese oxide (LMO), and the negative electrode active material forming the negative electrode of the battery 40 is, for example, a material containing at least one material among hard carbon and graphite. Further, the battery 40 may be, for example, a cassette type battery pack, which is removably attached to the vehicle 10. The battery 40 stores power supplied from a charger (not shown) outside of the vehicle 10, and discharges power for traveling of the vehicle 10.

The battery sensor 42 detects a physical quantity such as current, voltage, and temperature of the battery 40. The battery sensor 42 includes, for example, a current sensor, a voltage sensor, and a temperature sensor. The battery sensor 42 detects a current of the second battery constructing the battery 40 (hereinafter simply referred to as "battery 40") by using the current sensor, detects a voltage of the battery 40 by using the voltage sensor, and detects a temperature of the battery 40 by using the temperature sensor. The battery sensor 42 outputs data of the physical quantity such as the detected current value, voltage value, and temperature of the battery 40 to the control unit 36 or a communication device 50.

The communication device 50 includes a wireless module for connecting to a cellular network or a Wi-Fi network. The communication device 50 may also include a wireless module for using Bluetooth (trademark) or the like. The communication device 50 transmits/receives various kinds of information on the vehicle 10 to/from, for example, the battery characteristic estimation device 100 through communication using the wireless module. The communication device 50 transmits the data of the physical quantity of the battery 40, which is output from the control unit 36 or the battery sensor 42, to the battery characteristic estimation device 100. The communication device 50 may receive information indicating the characteristic of the battery 40, which has been diagnosed and transmitted by the battery characteristic estimation device 100 described later, and output the received information indicating the characteristic of the battery 40 to an HMI (not shown) of the vehicle 10.

[Configuration of Battery Characteristic Estimation Device]

Figure 2:
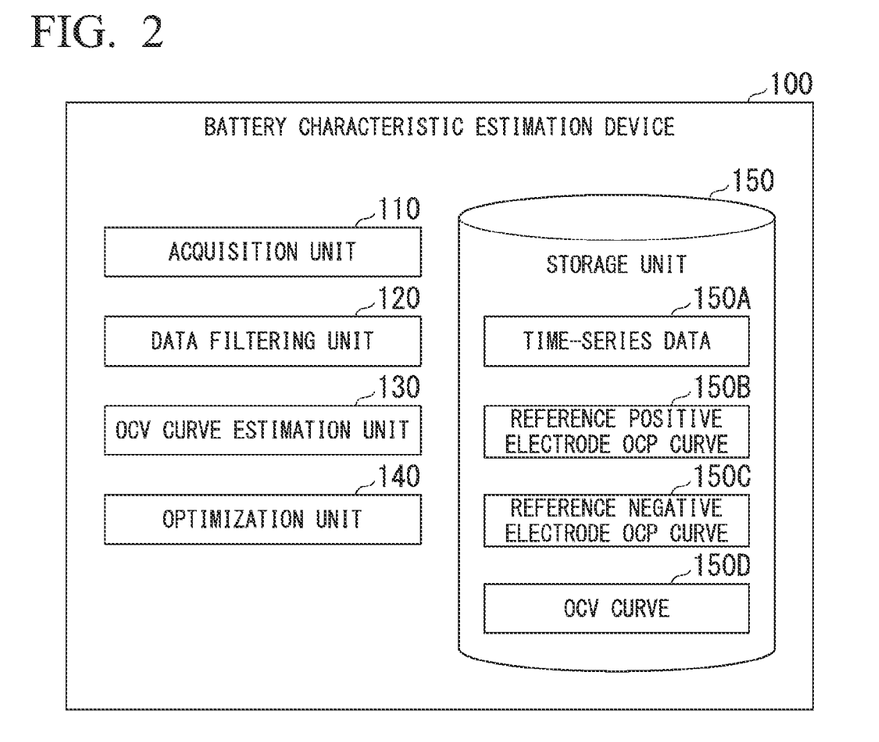
FIG. 2 is a diagram illustrating an exemplary configuration of the battery characteristic estimation device according to an embodiment.

Next, description is given of an example of the battery characteristic estimation device 100 estimating the characteristic of the battery 40 of the vehicle 10. FIG. 2 is a diagram illustrating an exemplary configuration of the battery characteristic estimation device 100 according to an embodiment. The battery characteristic estimation device 100 includes, for example, an acquisition unit 110, a data filtering unit 120, an OCV curve estimation unit 130, an optimization unit 140, and a storage unit 150. The acquisition unit 110, the data filtering unit 120, the OCV curve estimation unit 130, and the optimization unit 140 are implemented by a hardware processor such as a CPU (Central Processing Unit) executing a program (software), for example. A part or all of these components may be implemented by hardware (circuit unit including circuitry) such as an LSI (Large Scale Integration), an ASIC (Application Specific Integrated Circuit), an FPGA (Field-Programmable Gate Array), or a GPU (Graphics Processing Unit), or may be implemented through cooperation between software and hardware. The program may be stored in a storage device (storage device including non-transitory storage medium) such as an HDD (Hard Disk Drive) or flash memory in advance, or may be stored in a removable storage medium (non-transitory storage medium) such as a DVD or CD-ROM and the storage medium may be attached to a drive device to install the program. The storage unit 150 is, for example, an HDD, a flash memory, or a random access memory (RAM). The storage unit 150 stores, for example, time-series data 150A, a reference negative electrode OCP curve 150C, and an OCV curve 150D.

The acquisition unit 110 uses a communication interface (not shown) mounted on the battery characteristic estimation device 100 to acquire time-series data of at least a voltage and current of the secondary battery 40 from the communication device 50, and store the time-series data into the storage unit 150 as primary acquisition data (not shown). The acquisition unit 110 integrates the current values included in the acquired time-series data to calculate discharge capacity (discharge amount), and stores the discharge capacity into the storage unit 150 as the time-series data 150A. At this time, the acquisition unit 110 may execute processing of excluding data for which loss or abnormality has occurred from the acquired primary acquisition data. Further, the discharge capacity may not be calculated by the battery characteristic estimation device 100, and may be calculated by the vehicle 10 and transmitted to the battery characteristic estimation device 100 via the communication device 50

The data filtering unit 120 extracts data for which a voltage change due to charge/discharge is small, that is, the voltage change is equal to or smaller than a predetermined value from the primary acquisition data acquired by the acquisition unit 110 and stored into the storage unit 150. The voltage change is an amount of change in voltage in a reference period. The acquisition unit 110 may also extract time-series data of the current of the battery 40 from the communication device 50, and the data filtering unit 120 may extract data for which the current value is equal to or smaller than a predetermined value from the extracted time-series data. In other cases, the data filtering unit 120 may extract data for which the voltage change is equal to or smaller than a first predetermined value and the current value is equal to or smaller than a second predetermined value. As a result, it is possible to acquire time-series data of the voltage and discharge capacity of the battery 40 at a timing at which the voltage of the battery 40 can be regarded as an OCV. The data filtering unit 120 stores the extracted time-series data into the storage unit 150 as the time-series data 150A.

The OCV curve estimation unit 130 uses a first parameter group described later to convert a reference positive electrode OCP curve 150B to a positive electrode OCP curve 150B #indicating a change in open circuit voltage with respect to the discharge capacity of the positive electrode, and uses a second parameter group described later to convert a reference negative electrode OCP curve 150C to a negative electrode OCP curve 150C #indicating a change in open circuit voltage with respect to the discharge capacity of the negative electrode. The OCV curve estimation unit 130 uses a difference between the positive electrode OCP curve 150B #and negative electrode OCP curve 150C #, which are obtained through conversion, to estimate the OCV curve 150D indicating a change in open circuit voltage with respect to the capacity change of the battery 40. The OCV curve estimation unit 130 stores the estimated OCV curve 150D into the storage unit 150.

The optimization unit 140 optimizes the first parameter group and the second parameter group such that the value of an error function representing an error between the OCV curve 150D estimated by the OCV curve estimation unit 130 and the time-series data 150A extracted by the data filtering unit 120 is equal to or smaller than a predetermined value. The OCV curve 150D optimized by the optimization unit 140 represents a characteristic of the battery 40 estimated as a result. Specific optimization processing to be executed by the optimization unit 140 is described later.

Figure 3:
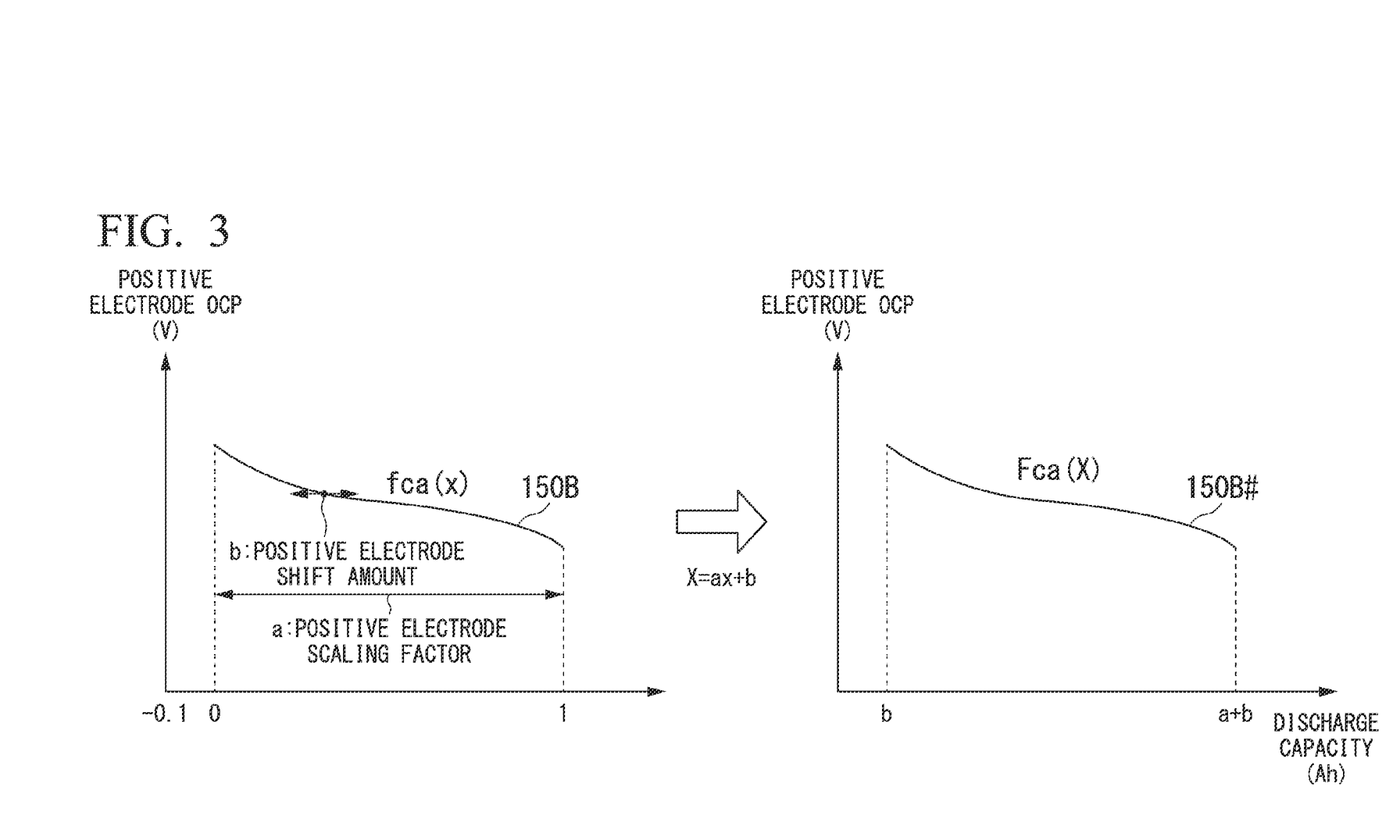
FIG. 3 is a diagram illustrating an example of a reference positive electrode OCP (open circuit potential) curve and a positive electrode OCP curve obtained by converting the reference positive electrode OCP curve.

FIG. 3 is a diagram illustrating an example of the reference positive electrode OCP curve 150B and the positive electrode OCP curve 150B #obtained by converting the reference positive electrode OCP curve 150B. The left part of FIG. 3 represents the reference positive electrode OCP curve 150B, and the right part of FIG. 3 represents the positive electrode OCP curve 150B #obtained by converting the reference positive electrode OCP curve 150B.

As illustrated in the left part of FIG. 3, the reference positive electrode OCP curve 150B represents a mathematical model $f_{ca}(x)$ serving as a reference for deriving the positive electrode OCP curve 150B #indicating an open circuit voltage change with respect to the discharge capacity of the positive electrode, in which the width of the discharge capacity x is normalized to 1. The OCV curve estimation unit 130 converts the reference positive electrode OCP curve 150B to the positive electrode OCP curve 150B #by using a positive electrode scaling factor a for converting the normalized width of the discharge capacity of the positive electrode and a positive electrode shift amount b, which is a shift amount in the discharge capacity direction from the reference positive electrode OCP curve 150B to the positive electrode OCP curve 150B #.

More specifically, the OCV curve estimation unit 130 converts x, which is a dimensionless variable, to a variable X having the dimension of the discharge capacity (Ah) by X=ax+b, and substitutes x=(X−b)/a into $f_{ca}(x)$ to obtain a mathematical model $F_{ca}(X)$ representing the positive electrode OCP curve 150B #. In this manner, the positive electrode scaling factor a and the positive electrode shift amount b are examples of "first parameter group".

Figure 4:
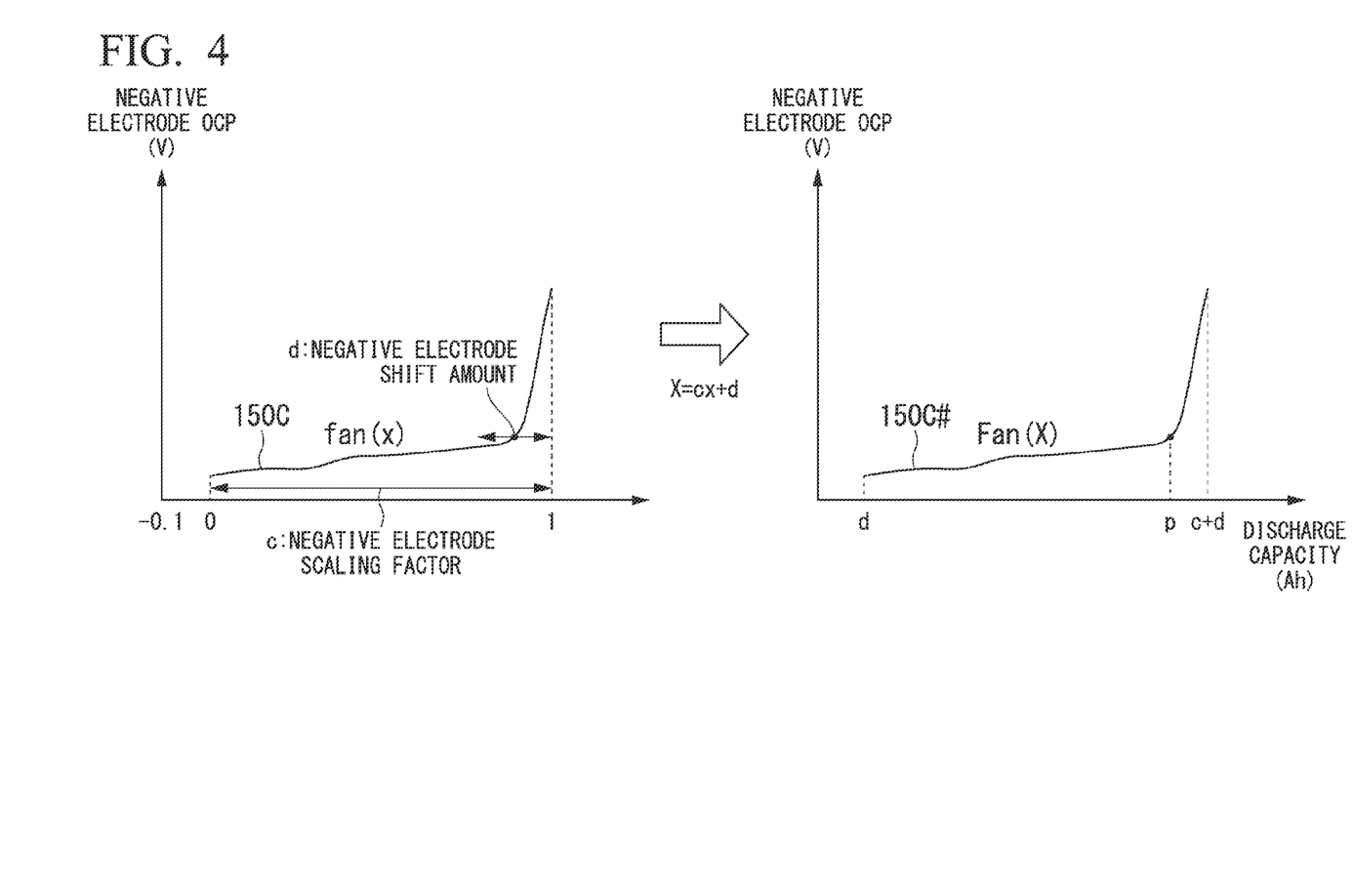
FIG. 4 is a diagram illustrating an example of a reference negative electrode OCP curve and a negative electrode OCP curve obtained by converting the reference negative electrode OCP curve.

FIG. 4 is a diagram illustrating an example of the reference negative electrode OCP curve 150C and the negative electrode OCP curve 150C #obtained by converting the reference negative electrode OCP curve 150C. The left part of FIG. 4 represents the reference negative electrode OCP curve 150C, and the right part of FIG. 4 represents the negative electrode OCP curve 150C #obtained by converting the reference negative electrode OCP curve 150C.

As illustrated in the left part of FIG. 4, the reference negative electrode OCP curve 150C represents a mathematical model $f_{an}(x)$ serving as a reference for deriving the negative electrode OCP curve 150C #indicating an open circuit voltage change with respect to the discharge capacity of the negative electrode, in which the width of the discharge capacity x is normalized to 1. The OCV curve estimation unit 130 converts the reference negative electrode OCP curve 150C to the negative electrode OCP curve 150C #by using a negative electrode scaling factor c for converting the normalized width of the discharge capacity of the negative electrode and a negative electrode shift amount d, which is a shift amount in the discharge capacity direction from the reference negative electrode OCP curve 150C to the negative electrode OCP curve 150C #.

More specifically, the OCV curve estimation unit 130 converts x, which is a dimensionless variable, to a variable X having the dimension of the discharge capacity (Ah) by X=cx+d, and substitutes x=(X−d)/c into $f_{an}(x)$ to obtain a mathematical model $F_{an}(X)$ representing the negative electrode OCP curve 150C #. In this manner, the negative electrode scaling factor c and the negative electrode shift amount d are examples of "second parameter group".

In FIG. 3 and FIG. 4, as an example, the widths of the discharge capacity x of the reference positive electrode OCP curve 150B and the reference negative electrode OCP curve 150C are normalized to 1. However, the present invention is not limited to such a configuration, and more generally, the widths of the discharge capacity x of the reference positive electrode OCP curve 150B and the reference negative electrode OCP curve 150C may be normalized to any value as long as the reference positive electrode OCP curve 150B and the reference negative electrode OCP curve 150C are mathematical models serving as a reference for optimizing the first parameter group and the second parameter group.

Further, in the above description, the first parameter group is set as the positive electrode scaling factor a and the positive electrode shift amount b, and the second parameter group is set as the negative electrode scaling factor c and the negative electrode shift amount d. However, the present invention is not limited to such a configuration. For example, the first parameter group may be set as the positive electrode scaling factor a and the positive electrode shift amount b, and the second parameter group may be set as the negative electrode scaling factor c and a relative shift amount e of the negative electrode OCP curve 150C #with respect to the positive electrode OCP curve 150B #in the discharge capacity direction. In this case, the OCV curve estimation unit 130 can derive the negative electrode shift amount d from the positive electrode shift amount b and the relative shift amount e. Further, for example, the first parameter group may be set as the positive electrode scaling factor a and the relative shift amount e of the positive electrode OCP curve 150B #with respect to the negative electrode OCP curve 150C #in the discharge capacity direction, and the second parameter group may be set as the negative electrode scaling factor c and the negative electrode shift amount d. In this case, the OCV curve estimation unit 130 can derive the positive electrode shift amount b from the negative electrode shift amount d and the relative shift amount e.

Figure 5:
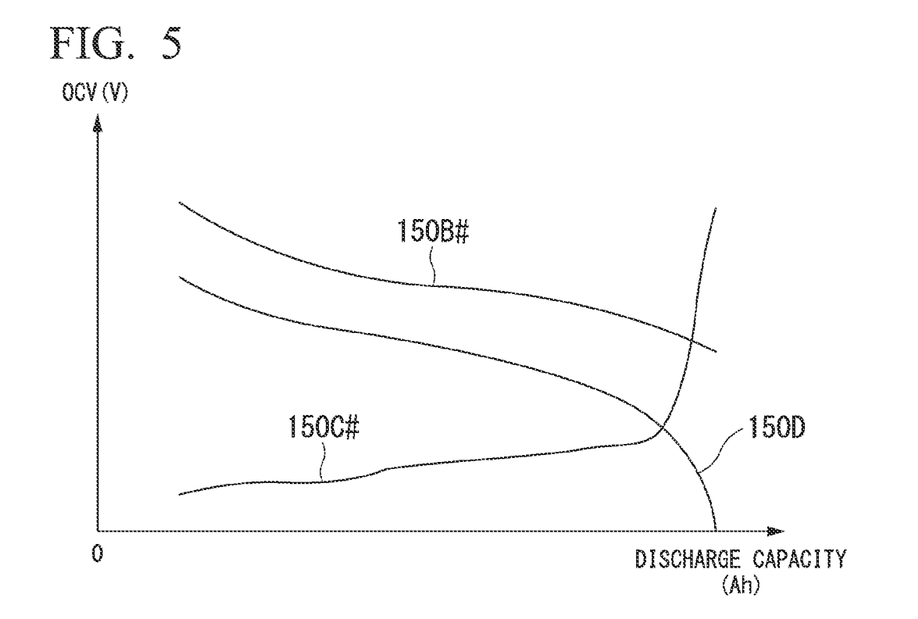
FIG. 5 is a diagram illustrating an example of an OCV curve derived on the basis of the positive electrode OCP curve and the negative electrode OCP curve.

FIG. 5 is a diagram illustrating an example of the OCV curve 150D derived on the basis of the positive electrode OCP curve 150B #and the negative electrode OCP curve 150C #. As illustrated in FIG. 5, the OCV curve estimation unit 130 estimates the OCV curve 150D by subtracting the negative electrode OCP curve 150C #obtained in FIG. 4 from the positive electrode OCP curve 150B #obtained in FIG. 3. The optimization unit 140 next optimizes the first parameter group and the second parameter group such that the value of the error function representing an error between the estimated OCV curve 150D and the time-series data 150A is equal to or smaller than a predetermined value.

Figure 6:
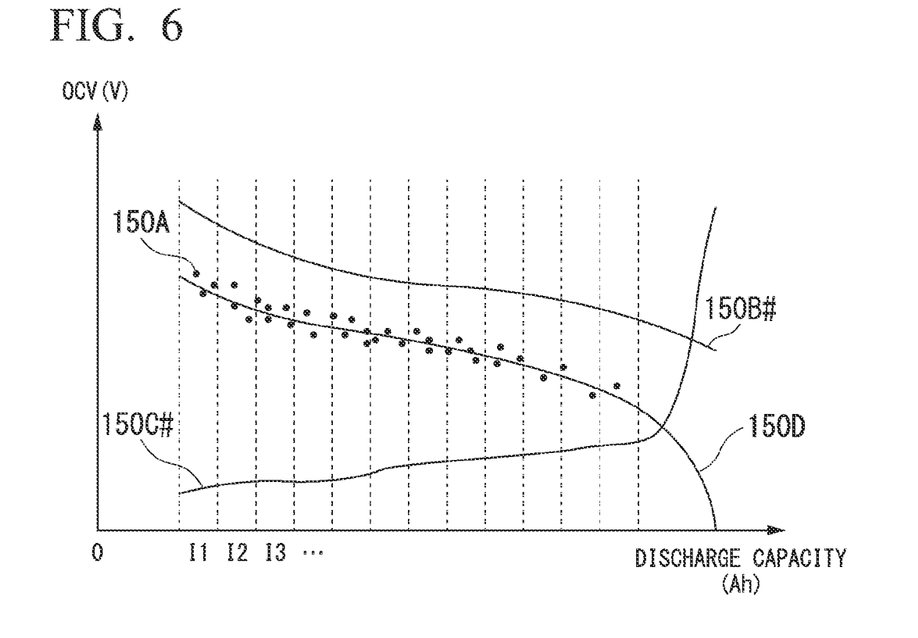
FIG. 6 is a diagram for describing optimization processing of the OCV curve, which is executed by an optimization unit.

FIG. 6 is a diagram for describing optimization processing of the OCV curve 150D, which is executed by the optimization unit 140. As illustrated in FIG. 6, the optimization unit 140 optimizes the first parameter group and the second parameter group such that the value of the error function representing an error between the OCV curve 150D estimated by the OCV curve estimation unit 130 and the time-series data 150A is equal to or smaller than a predetermined value. More specifically, the optimization unit 140 optimizes the first parameter group and the second parameter group such that the value of the error function is equal to or smaller than a predetermined value using, for example, local optimization algorithms such as the BFGS, conjugate gradient, and COBYLA methods, or global optimization algorithms such as genetic algorithms, differential evolution, SHGO, and annealing methods.

At this time, the optimization unit 140 sets, as the error function, a function that increases depending on the sum of the OCV curve 150D and a value obtained by multiplying a weight by the error of each data extracted by the data filtering unit 120. More specifically, the optimization unit 140 first divides the discharge capacity (Ah) into specific intervals $I_1, I_2, I_3, \ldots$, and calculates data amounts $n_1, n_2, n_3$, included in each interval. Next, the optimization unit 140 takes a reciprocal of each of the data amounts $n_1, n_2, n_3, \ldots$ to calculate a weight $w_k$ corresponding to each interval as $w_k=(1/n_k)/(\text{sum}(1/n_i))$. Next, as illustrated in the following expression (1), the optimization unit 140 uses the calculated weight to define a weighted root mean square error (RMSE) as the error function.

[Math. 1]

$$\text{Weighted } RMSE = \sqrt{\frac{\sum_{k=1}^{N}(Pred_i - Act_i)^2 \times w_i}{N}} \quad (1)$$

FIG. 6 describes an example of counting the data amount of the time-series data 150A for each interval of the discharge capacity (that is, horizontal-axis direction) and calculating the weight $w_k$ corresponding to the interval. However, the present invention is not limited to such a configuration. For example, the data amount of the time-series data 150A may be counted for each section of the voltage (that is, vertical-axis direction) to calculate the weight $w_k$ corresponding to the interval. Further, the method of calculating the weight $w_k$ is not limited to taking a reciprocal, and more generally, it suffices that the weight $w_k$ may be given a smaller value as the section has a larger data amount.

In expression (1), $pred_i$ represents an open voltage estimation value on the OCV curve 150D, and $Act_i$ represents an open voltage value recorded as the time-series data 150A. Expression (1) gives an example of calculating an error by taking a square root of the mean square error. However, the present invention is not limited to such a configuration, and a power root of the mean square error may be taken using any exponent. Alternatively, as shown in the following expression (2), the optimization unit 140 may use the calculated weight to define the weighted mean absolute error (MAE) as the error function. Through such weighting, it is possible to prevent the OCV curve 150D from being fitted excessively to an interval of the time-series data 150A, which has a large data amount.

[Math. 2]

$$\text{Weighted } MAE = \frac{\sum_{i=1}^{N}(|Pred_i - Act_i| \times w_i)}{N} \quad (2)$$

The optimization unit 140 constrains the relationship between the negative electrode scaling factor c and the negative electrode shift amount d by using any function c=f(d) when using the above-mentioned error function to optimize the positive electrode scaling factor a and the positive electrode shift amount b, which belong to the first parameter group, and optimize the negative electrode scaling factor c and the negative electrode shift amount d, which belong to the second parameter group. This is because, as illustrated in FIG. 4, in the negative electrode OCP curve 150C #, the negative electrode OCP tends to take substantially a constant value until the discharge capacity y reaches a predetermined point P. In particular, the optimization unit 140 may constrain the negative electrode scaling factor c as a constant. Further, when the optimization unit 140 uses the above-mentioned relative shift amount e as a parameter, the optimization unit 140 may constrain the relationship between the negative electrode scaling factor c and the relative shift amount e by using any function c=g(e).

When the negative electrode of the battery 40 is graphite-based material, the negative electrode OCP curve 150C #is flat in the range of small discharge capacity. As a result, for example, low SOC (high discharge capacity) area data is needed to identify a characteristic part after a point P in FIG. 4. It is difficult to acquire such low SOC area data in some cases, and thus the optimization unit 140 may set the negative electrode scaling factor c by holding in advance a map showing the change of the negative electrode scaling factor c with respect to the battery usage time or the integrated charge/discharge amount, and referring to the map without optimizing the negative electrode scaling factor c. As a result, it is possible to further reduce the calculation load required for optimization processing of parameters.

Figure 7:
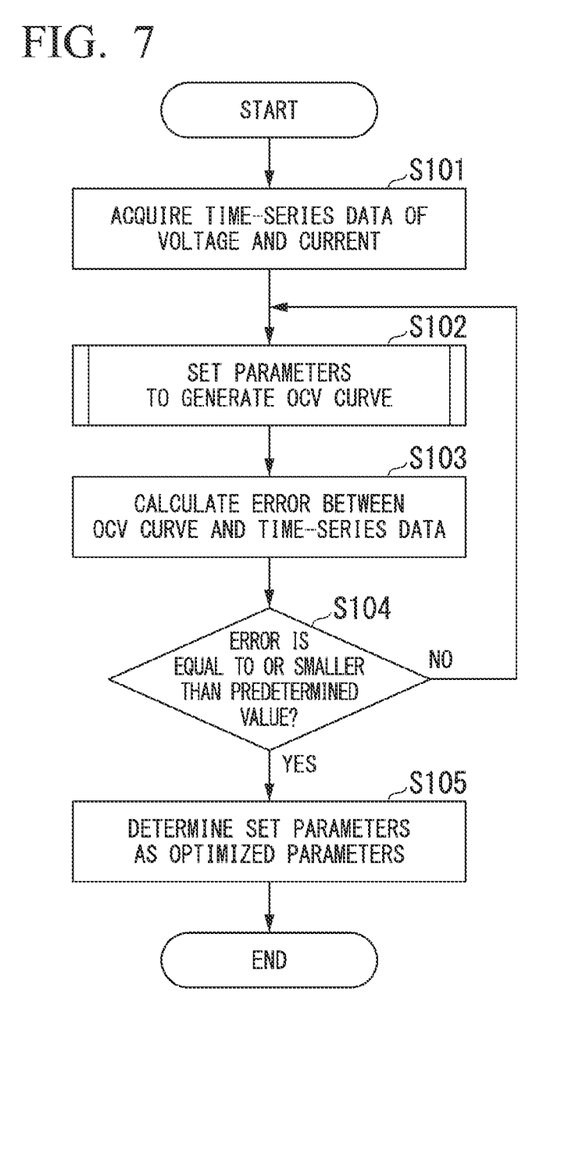
FIG. 7 is a flow chart illustrating an example of a flow of processing to be executed by the battery characteristic estimation device.

Next, referring to FIG. 7, description is given of a flow of processing to be executed by the battery characteristic estimation device 100 according to this embodiment. FIG. 7 is a flow chart illustrating an example of the flow of processing to be executed by the battery characteristic estimation device 100.

First, the battery characteristic estimation device 100 acquires time-series data 150A of at least the voltage and current of the vehicle 10 from the vehicle 10 (Step S101). Next, the battery characteristic estimation device 100 sets the first parameter group and the second parameter group, and generates the OCV curve 150D on the basis of theses parameter groups, the reference positive electrode OCP curve 150B, and the reference negative electrode OCP curve 150C (Step S102). A detailed flow of the processing of Step S102 is described later with reference to FIG. 8 and FIG. 9.

Next, the battery characteristic estimation device 100 calculates an error between the acquired time-series data 150A and the generated OCV curve 150D (Step S103). Next, the battery characteristic estimation device 100 determines whether or not the calculated error is equal to or smaller than a predetermined value (S104). When it is determined that the calculated error is not equal to or smaller than the predetermined value, the battery characteristic estimation device 100 returns to Step S102, and resets the first parameter group and the second parameter group to generate the OCV curve 150D. On the other hand, when it is determined that the calculated error is equal to or smaller than the predetermined value, the battery characteristic estimation device 100 determines the first parameter group and the second parameter group, which are set in Step S102, as the optimized parameters (Step S105). Then, the processing of this flow chart is finished.

Figure 8:
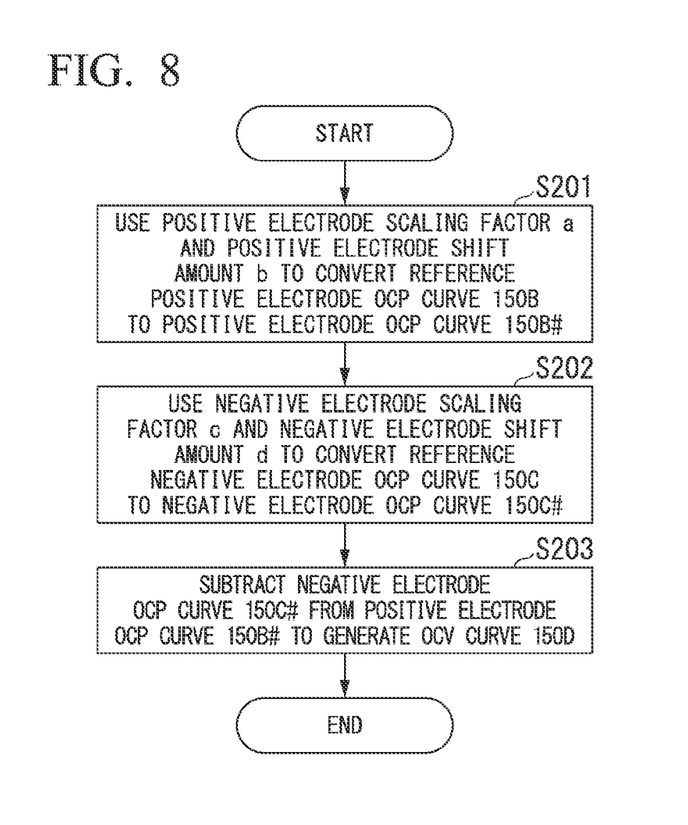
FIG. 8 is a flow chart illustrating an example of a flow of generation processing of the OCV curve, which is executed by an OCV curve estimation unit.

Next, referring to FIG. 8, description is given of a flow of generation processing of the OCV curve 150D, which is executed by the OCV curve estimation unit 130. FIG. 8 is a flow chart illustrating an example of the flow of generation processing of the OCV curve 150D, which is executed by an OCV curve estimation unit 130. The OCV curve estimation unit 130 first uses the positive electrode scaling factor a and the positive electrode shift amount b, which belong to the first parameter group, to convert the reference positive electrode OCP curve 150B to the positive electrode OCP curve 150B #(Step S201). More specifically, the OCV curve estimation unit 130 converts the variables of the function $f_{ca}(x)$ representing the reference positive electrode OCP curve 150B by using X=ax+b, to obtain a function $F_{ca}(X)$ representing the positive electrode OCP curve 150B #. Next, the OCV curve estimation unit 130 uses the negative electrode scaling factor c and the negative electrode shift amount d, which belong to the second parameter group, to convert the reference negative electrode OCP curve 150C to the negative electrode OCP curve 150C #(Step S202). More specifically, the OCV curve estimation unit 130 converts the variables of the function $f_{an}(x)$ representing the reference negative electrode OCP curve 150C by using X=cx+d, to obtain a function $F_{an}(X)$ representing the negative electrode OCP curve 150C #. Next, the OCV curve estimation unit 130 subtracts the negative electrode OCP curve 150C #from the positive electrode OCP curve 150B #to obtain the OCV curve 150D (Step S203). Then, the processing of this flow chart is finished.

Figure 9:
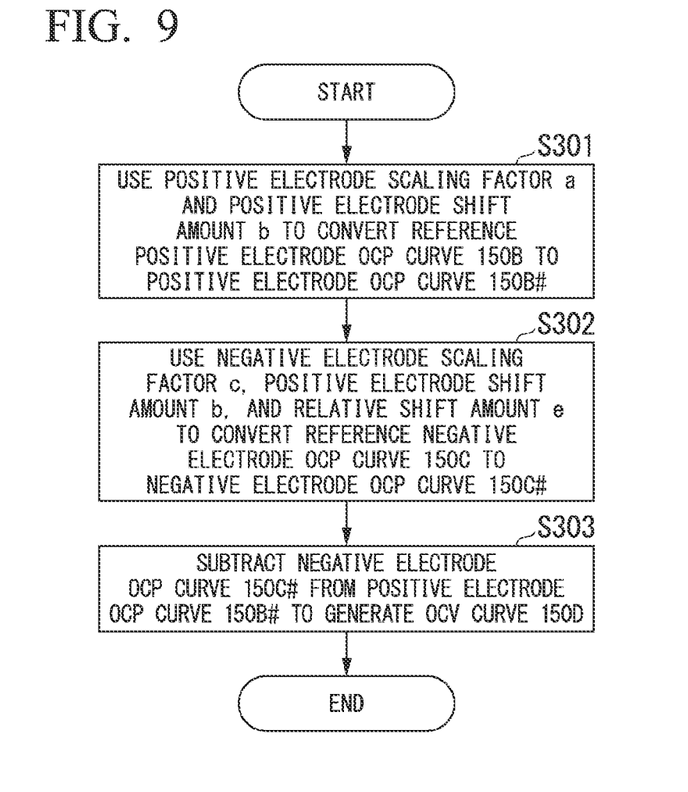
FIG. 9 is a flow chart illustrating another example of the flow of generation processing of the OCV curve, which is executed by the OCV curve estimation unit.

Next, referring to FIG. 9, description is given of a flow of generation processing of the OCV curve 150D, which is executed by the OCV curve estimation unit 130. FIG. 9 is a flow chart illustrating another example of the flow of generation processing of the OCV curve, which is executed by the OCV curve estimation unit. The OCV curve estimation unit 130 first uses the positive electrode scaling factor a and the positive electrode shift amount b, which belong to the first parameter group, to convert the reference positive electrode OCP curve 150B to the positive electrode OCP curve 150B #(Step S301). More specifically, the OCV curve estimation unit 130 converts the variables of the function $f_{ca}(x)$ representing the reference positive electrode OCP curve 150B by using X=ax+b, to obtain a function $F_{ca}(X)$ representing the positive electrode OCP curve 150B #. Next, the OCV curve estimation unit 130 uses the positive electrode shift amount b, the negative electrode scaling factor c, which belongs to the second parameter group, and the relative shift amount e of the negative electrode OCP curve 150C #with respect to the positive electrode OCP curve 150B #in the discharge capacity y direction to convert the reference negative electrode OCP curve 150C to the negative electrode OCP curve 150C #(Step S302). More specifically, the OCV curve estimation unit 130 converts the variables of the function $f_{an}(x)$ representing the reference negative electrode OCP curve 150C by using X=cx+b+e, to obtain a function $F_{an}(X)$ representing the negative electrode OCP curve 150C #. Next, the OCV curve estimation unit 130 subtracts the negative electrode OCP curve 150C #from the positive electrode OCP curve 150B #to generate the OCV curve 150D (Step S303). Then, the processing of this flow chart is finished.

The flow chart of FIG. 9 describes an example in which the OCV curve estimation unit 130 generates the OCV curve 150D by using the positive electrode shift amount b, the relative shift amount e of the negative electrode OCP curve 150C #with respect to the positive electrode OCP curve 150B #in the discharge capacity y direction. However, when the OCV curve estimation unit 130 uses the negative electrode shift amount d and the relative shift amount e of the positive electrode OCP curve 150B #with respect to the negative electrode OCP curve 150C #in the discharge capacity y direction, the OCV curve estimation unit 130 converts the variables of the function $f_{ca}(x)$ representing the reference positive electrode OCP curve 150B by using X=ax+d+e, to obtain a function $F_{ca}(X)$ representing the positive electrode OCP curve 150B #.

According to the embodiment described above, without executing differentiation processing or the like, the parameter groups are optimized such that the value of an error function representing an error between time-series data acquired from the vehicle 10 and the OCV curve estimated on the basis of the parameter groups is equal to or smaller than a predetermined value. As a result, it is possible to reduce the calculation load required for optimization processing of parameters.

The embodiment described above can be represented in the following manner.

A battery characteristic estimation device including a storage medium that stores computer-readable instructions, and a processor coupled to the storage medium, the processor executing the computer-readable instructions to: acquire time-series data of at least a voltage and current of a secondary battery having a positive electrode containing a positive electrode active material and a negative electrode containing a negative electrode active material; store a reference positive electrode OCP curve, which indicates an open circuit voltage change with respect to a discharge capacity of the positive electrode, and a reference negative electrode OCP curve, which indicates an open circuit voltage change with respect to a discharge capacity of the negative electrode; convert the reference positive electrode OCP curve into a positive electrode OCP curve in accordance with a first parameter group, convert the reference negative electrode OCP curve into a negative electrode OCP curve in accordance with a second parameter group, and estimate an OCV curve, which indicates an open circuit voltage change with respect to a capacity change of the secondary battery, on the basis of a difference between the positive electrode OCP curve and the negative electrode OCP curve; and optimize the first parameter group and the second parameter group such that a value of an error function representing an error between the estimated OCV curve and the time-series data is equal to or smaller than a predetermined value.

This concludes the description of the embodiment for carrying out the present invention. The present invention is not limited to the embodiment in any manner, and various kinds of modifications and replacements can be made within a range that does not depart from the gist of the present invention. For example, the present invention can be applied to power conversion equipment and grids, which can be connected to commercial power systems.

What is claimed is:

1. A battery characteristic estimation device comprising a storage medium that stores computer-readable instructions, and a processor coupled to the storage medium, the processor executing the computer-readable instructions to:

acquire time-series data of at least a voltage and current of a secondary battery mounted on a vehicle and having a positive electrode containing a positive electrode active material and a negative electrode containing a negative electrode active material;

store a reference positive electrode OCP curve, which indicates an open circuit voltage change with respect to a discharge capacity of the positive electrode, and a reference negative electrode OCP curve, which indicates an open circuit voltage change with respect to a discharge capacity of the negative electrode;

convert the reference positive electrode OCP curve into a positive electrode OCP curve in accordance with a first parameter group, convert the reference negative electrode OCP curve into a negative electrode OCP curve in accordance with a second parameter group, and estimate an OCV curve, which indicates an open circuit voltage change with respect to a capacity change of the secondary battery, on the basis of a difference between the positive electrode OCP curve and the negative electrode OCP curve;

optimize the first parameter group and the second parameter group such that a value of an error function representing an error between the estimated OCV curve and the time-series data is equal to or smaller than a predetermined value; and provide, to the vehicle, information related to the estimated OCV curve after optimization as information indicating a characteristic of the secondary battery, and display the information on a display device of the vehicle, wherein the first parameter group includes a positive electrode scaling factor for converting a width of a reference discharge capacity of a positive electrode into a width of an actual discharge capacity and a positive electrode shift amount, which is a shift amount in a discharge capacity direction from the reference positive electrode OCP curve to the positive electrode OCP curve, wherein the second parameter group includes a negative electrode scaling factor for converting a width of a reference discharge capacity of a negative electrode into a width of an actual discharge capacity and a negative electrode shift amount, which is a shift amount in a discharge capacity direction from the reference negative electrode OCP curve to the negative electrode OCP curve, and wherein the processor optimizes the first parameter group and the second parameter group by constraining a relationship between the negative electrode scaling factor and the negative electrode shift amount using a specific function.

2. The battery characteristic estimation device according to claim 1, wherein the first parameter group includes a positive electrode scaling factor for converting a width of a reference discharge capacity of a positive electrode into a width of an actual discharge capacity and a positive electrode shift amount, which is a shift amount in a discharge capacity direction from the reference positive electrode OCP curve to the positive electrode OCP curve, and the second parameter group includes a negative electrode scaling factor for converting a width of a reference discharge capacity of a negative electrode into a width of an actual discharge capacity and a relative shift amount of the negative electrode OCP curve with respect to the positive electrode OCP curve in a discharge capacity direction, or wherein the first parameter group includes a positive electrode scaling factor for converting a width of a reference discharge capacity of a positive electrode into a width of an actual discharge capacity and a relative shift amount of the positive electrode OCP curve with respect to the negative electrode OCP curve in a discharge capacity direction, and the second parameter group includes a negative electrode scaling factor for converting a width of a reference discharge capacity of a negative electrode into a width of an actual discharge capacity and a negative electrode shift amount, which is a shift amount in a discharge capacity direction from the reference negative electrode OCP curve to the negative electrode OCP curve.

3. The battery characteristic estimation device according to claim 1, wherein the positive electrode active material is a material containing at least one material among nickel cobalt manganese (NCM), nickel cobalt aluminum (NCA), lithium ferrophosphate (LFP), and lithium manganese oxide (LMO), wherein the negative electrode active material is a material containing at least one material among hard carbon and graphite, wherein the processor sets the negative electrode scaling factor on the basis of a map indicating a change in the negative electrode scaling factor with respect to a usage period of the battery or charge/discharge amount integrated value, and wherein the processor optimizes first parameter group and the second parameter group excluding the negative electrode scaling factor such that a value of an error function representing an error with respect to the time-series data is equal to or smaller than a predetermined value.

4. The battery characteristic estimation device according to claim 1, wherein the processor extracts data, for which a voltage change due to charge/discharge is equal to or smaller than the predetermined value, from the time-series data, and wherein the processor performs optimization such that an error between the OCV curve and the extracted data is equal to or smaller than the predetermined value.

5. The battery characteristic estimation device according to claim 4, wherein the error function is a function that increases depending on a sum of the OCV curve and a value obtained by multiplying a weight by an error of each extracted data, and wherein the weight is set by counting the number of pieces of data of the extracted data for a plurality of sections of the discharge capacity or voltage value and decreasing a value of a weight corresponding to one of the plurality of sections as the counted number of pieces of data becomes larger.

6. A battery characteristic estimation method to be executed by a computer, the battery characteristic estimation method comprising:

acquiring time-series data of at least a voltage and current of a secondary battery having a positive electrode containing a positive electrode active material and a negative electrode containing a negative electrode active material;

storing a reference positive electrode OCP curve, which indicates an open circuit voltage change with respect to a discharge capacity of the positive electrode, and a reference negative electrode OCP curve, which indicates an open circuit voltage change with respect to a discharge capacity of the negative electrode;

converting the reference positive electrode OCP curve into a positive electrode OCP curve in accordance with a first parameter group, convert the reference negative electrode OCP curve into a negative electrode OCP curve in accordance with a second parameter group, and estimate an OCV curve, which indicates an open circuit voltage change with respect to a capacity change of the secondary battery, on the basis of a difference between the positive electrode OCP curve and the negative electrode OCP curve;

optimizing the first parameter group and the second parameter group such that a value of an error function representing an error between the estimated OCV curve and the time-series data is equal to or smaller than a predetermined value, and providing, to a vehicle, information related to the estimated OCV curve after optimization as information indicating a characteristic of the secondary battery, and displaying the information on a display device of the vehicle, wherein the first parameter group includes a positive electrode scaling factor for converting a width of a reference discharge capacity of a positive electrode into a width of an actual discharge capacity and a positive electrode shift amount, which is a shift amount in a discharge capacity direction from the reference positive electrode OCP curve to the positive electrode OCP curve, wherein the second parameter group includes a negative electrode scaling factor for converting a width of a reference discharge capacity of a negative electrode into a width of an actual discharge capacity and a negative electrode shift amount, which is a shift amount in a discharge capacity direction from the reference negative electrode OCP curve to the negative electrode OCP curve, and wherein the computer optimizes the first parameter group and the second parameter group by constraining a relationship between the negative electrode scaling factor and the negative electrode shift amount using a specific function.

7. A non-transitory computer-readable storage medium storing a program, the program causing a computer to execute:

acquiring time-series data of at least a voltage and current of a secondary battery having a positive electrode containing a positive electrode active material and a negative electrode containing a negative electrode active material;

storing a reference positive electrode OCP curve, which indicates an open circuit voltage change with respect to a discharge capacity of the positive electrode, and a reference negative electrode OCP curve, which indicates an open circuit voltage change with respect to a discharge capacity of the negative electrode;

converting the reference positive electrode OCP curve into a positive electrode OCP curve in accordance with a first parameter group, convert the reference negative electrode OCP curve into a negative electrode OCP curve in accordance with a second parameter group, and estimate an OCV curve, which indicates an open circuit voltage change with respect to a capacity change of the secondary battery, on the basis of a difference between the positive electrode OCP curve and the negative electrode OCP curve;

optimizing the first parameter group and the second parameter group such that a value of an error function representing an error between the estimated OCV curve and the time-series data is equal to or smaller than a predetermined value, and providing, to a vehicle, information related to the estimated OCV curve after optimization as information indicating a characteristic of the secondary battery, and displaying the information on a display device of the vehicle, wherein the first parameter group includes a positive electrode scaling factor for converting a width of a reference discharge capacity of a positive electrode into a width of an actual discharge capacity and a positive electrode shift amount, which is a shift amount in a discharge capacity direction from the reference positive electrode OCP curve to the positive electrode OCP curve, wherein the second parameter group includes a negative electrode scaling factor for converting a width of a reference discharge capacity of a negative electrode into a width of an actual discharge capacity and a negative electrode shift amount, which is a shift amount in a discharge capacity direction from the reference negative electrode OCP curve to the negative electrode OCP curve, and wherein the computer optimizes the first parameter group and the second parameter group by constraining a relationship between the negative electrode scaling factor and the negative electrode shift amount using a specific function.

* * * * *